June 5, 1956 — S. GUARNASCHELLI — 2,748,803
REINFORCED HOSE
Filed Aug. 10, 1953 — 2 Sheets-Sheet 1
FIG. 1.
FIG. 3.
FIG. 2.
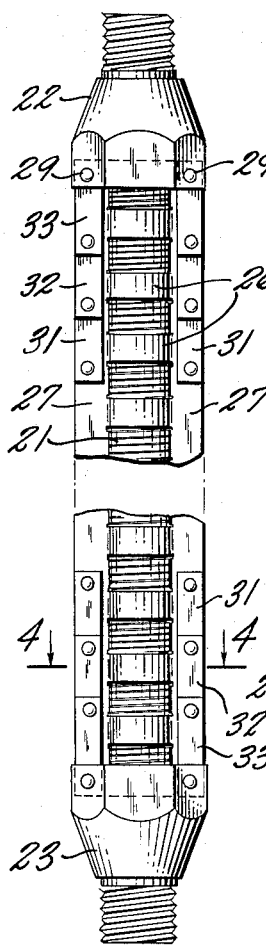
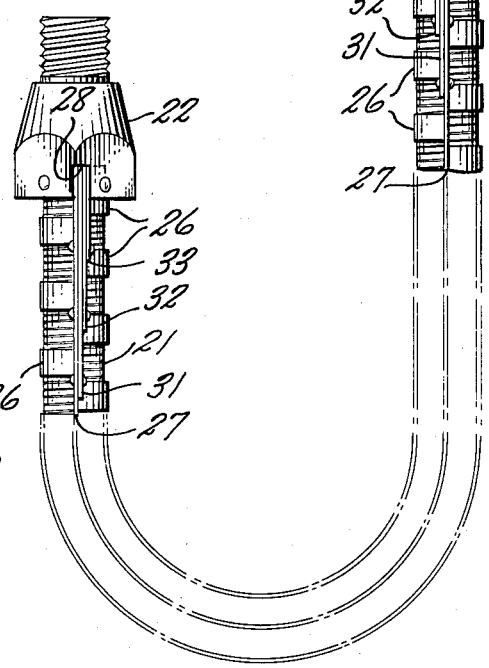
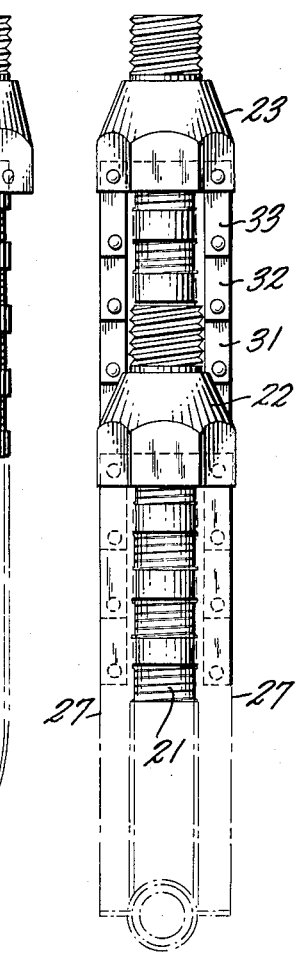
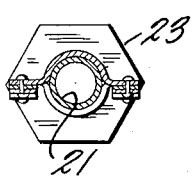
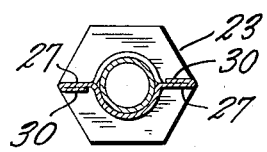
FIG. 4.   FIG. 5.
INVENTOR
STEPHEN GUARNASCHELLI
BY
ATTORNEYS June 5, 1956  S. GUARNASCHELLI  2,748,803
REINFORCED HOSE
Filed Aug. 10, 1953　　2 Sheets-Sheet 2
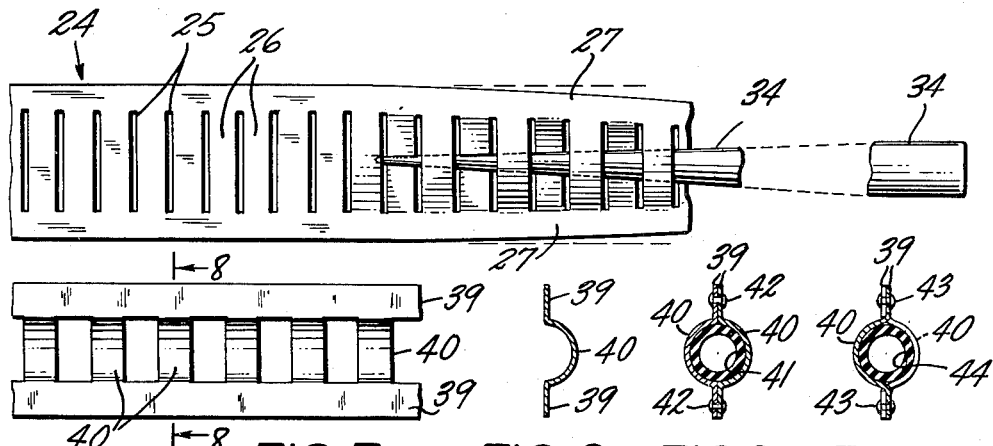
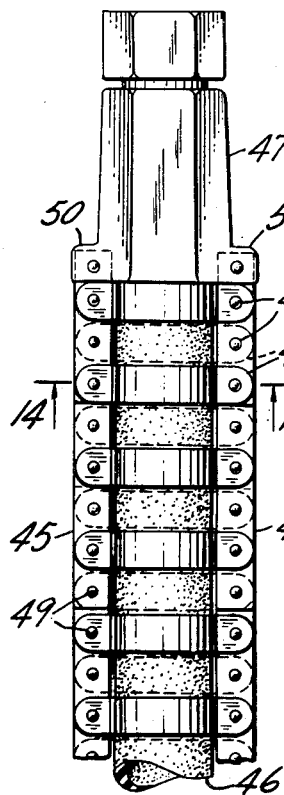
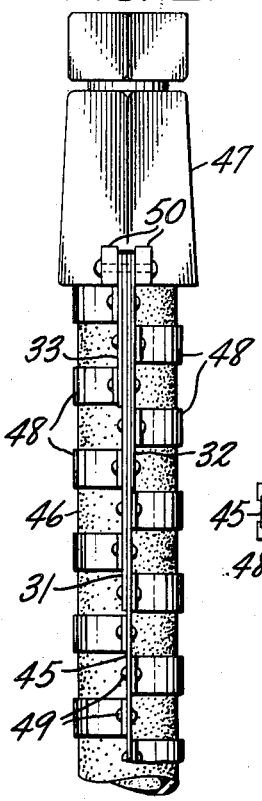
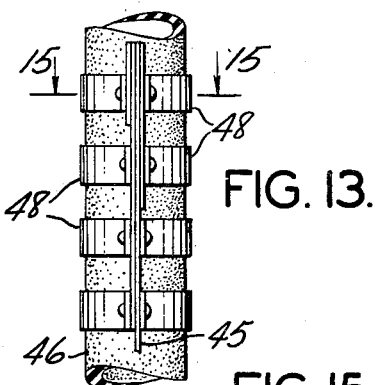
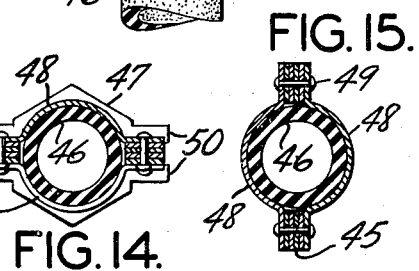
INVENTOR
STEPHEN GUARNASCHELLI

United States Patent Office 2,748,803
Patented June 5, 1956

2,748,803
REINFORCED HOSE

Stephen Guarnaschelli, Garden City, N. Y., assignor to Titeflex, Inc., Newark, N. J., a corporation of Massachusetts Application August 10, 1953, Serial No. 373,206

10 Claims. (Cl. 138—50)

This invention relates to reinforced hose and to the hose reinforcing member. The hose may be flexible metal hose comprising a convoluted or a corrugated metal tube, either seamless or made from a profiled strip of metal helically wound into tubular form with the overlapping edges of the strip locked together in a continuous seam, or it may be non-metallic hose having a rubber or other suitable jacket, either with or without braids or wrappings of wire or non-metallic material incorporated in the wall thereof.

It is an object of the invention to provide improved reinforced hose and hose reinforcing members. It is a further object of the invention to provide hose reinforcement which will restrain the hose against longitudinal extension and against radial expansion. It also is an object of the invention to provide hose reinforcement which will restrain the hose against twisting and which will substantially limit flexure of the hose to a single plane. It is another object of the invention to provide hose reinforcement which is connected to the end fittings of the hose and in which the reinforcement provides a graduated resistance to flexure adjacent the end fittings. It is still another object of the invention to provide a hose reinforcement which is simple and economical to manufacture and apply to the hose. Other objects and advantages of the invention will appear hereinafter.

Flexible metal hose customarily is reinforced by a braided wire casing applied over the hose and secured at its ends to the end fittings of the hose. This wire casing may comprise a single braid layer, or overlying braid layers. A braid layer may consist of a braid of flat ribbon wires, or a braid of round wires, the latter usually being applied in a basket weave. A multiple layer casing may comprise different kinds of braids, for example an inner braid of flat ribbon wires and an outer basket weave braid of round wires. Longitudinal extension and radial expansion of the hose are restrained by such a reinforcement. Application of these braided reinforcing casings to flexible metal hose is a costly and time-consuming operation. The braided casing has relatively little effect to restrain the hose against twisting when subjected to torsional forces, and when the hose is bent the stresses tend to be concentrated in the braid adjacent the end fitting. When a fault occurs in the braided casing it usually is adjacent an end fitting and if the braided casing fails at this point there no longer is any restraint against longitudinal extension or radial expansion of the hose.

Non-metallic hose also may be reinforced by an externally applied braided casing, which may be made from metal wires or from non-metallic material. Sometimes an external braided casing is used in addition to braids or wrappings of wire or non-metallic material incorporated in the wall of the hose, and other times it is used in lieu of internal reinforcement. The objections to the use of braided reinforcement for non-metallic hose are similar to the objections to the use of such reinforcement for flexible metal hose.

The hose reinforcement of the present invention may replace the externally applied braided casing entirely, or if desired it may replace only the outer braid in a hose which otherwise would have a multiple layer braided casing. When used with non-metallic hose which otherwise would have reinforcement incorporated within the non-metallic wall of the hose, the reinforcement of the present invention may make unnecessary some or all reinforcement within the wall.

A preferred embodiment of the present invention selected for purposes of illustration is shown in the accompanying drawings, wherein:

Figure 1 is an elevation of a flexible metal hose having a reinforcing member secured thereon;

Figure 2 is an elevation showing the reinforced hose of Figure 1 rotated 90° about its longitudinal axis and bent to U-shape;

Figure 3 is a view of the bent hose of Figure 2, looking toward the right as viewed in that figure;

Figure 4 is a transverse sectional view through the reinforced hose of Figure 1, taken substantially on the line 4—4;

Figure 5 is a view similar to Figure 4, but showing a slightly modified reinforcement construction;

Figure 6 is the fragmentary view of a metal ribbon blank from which the reinforcing member shown in Figures 1–4 is formed, showing one manner of forming the reinforcement;

Figures 7 and 8 are, respectively, elevation and transverse sectional views showing a modified form of hose reinforcing member which will be used in pairs to reinforce hose;

Figures 9 and 10 illustrate two different ways in which a pair of the hose reinforcing members shown in Figures 7 and 8 can be applied to a hose;

Figure 11 is a fragmentary elevation of a hose and end fitting illustrating a further modification of the hose reinforcing member;

Figure 12 is a view similar to Figure 11, but showing the reinforced hose rotated 90° about its longitudinal axis;

Figure 13 is a fragmentary view similar to Figure 12, but omitting the end fitting, illustrating an alternative manner of assembling the hose reinforcing members of Figures 11 and 12 on the hose;

Figure 14 is a transverse sectional view through the reinforced hose of Figure 11 taken substantially on the line 14—14; and Figure 15 is a transverse sectional view through the reinforced hose of Figure 13, taken substantially on the line 15—15.

The illustrative embodiment disclosed in Figures 1–4 will be described first. Attached to the flexible metal hose 21 with fluid tight joints are the end fittings 22, 23. These end fittings may be screwthreaded for convenience in making connections to the equipment with which the hose is to be used. In this embodiment the reinforcing member comprises a ribbon 24 (Figure 6) of metal of width greater than the diameter of the hose and having a plurality of parallel slits 25 extending transversely of the ribbon, these slits terminating at uniform distances from the side edges thereof. This slitting provides the ribbon with a plurality of crossbands 26 interconnecting the strips 27, the latter being the uncut edge portions of the ribbon. Alternate crossbands are pressed outwardly from the plane of the ribbon in one direction to approximately a half-round contour and intervening crossbands are similarly pressed in the opposite direction, the crossbands thus providing a channel through which the hose extends. The hose is pushed or pulled into this channel before the end fittings are attached. Preferably the channel is made larger than the hose only by an amount necessary to permit ready insertion of the hose into the channel.

The strips 27 of the ribbon are secured at their ends to the end fittings 22, 23 on the hose. For example, the end faces of the fittings may be slotted diametrically as indicated at 28 to receive the ends of the strips 27, which may be secured therein, for example, by pins 29, or by soldering, or both. The hose 21 is held in definite relation to the strips by the crossbands 26, and since the ends of the strips are secured to the end fittings 22, 23 the hose is restrained against longitudinal extension. Also, the crossbands reinforce and restrain the hose against radial expansion.

The plane of the strips 27, i. e. the longitudinal plane through the major transverse axis, is the same as the original plane of the ribbon 24 and this plane passes through the longitudinal axis of the hose. The ribbon is relatively inflexible in the longitudinal plane through the major transverse axis and thus the reinforced hose as viewed in Figure 1 is restrained against flexure to right or to left. However, the hose may be flexed readily in the longitudinal plane through the minor transverse axis of the strip, as shown in Figure 2. The fact that flexure of the hose is substantially restrained to a single plane assists in keeping the longitudinal axes of the end fittings in a common plane when the hose is bent, as it usualy will be for installation. In this way the danger of establishing concentrated stress zones in the hose adjacent the end fittings at the time of installation is reduced.

The reinforcing member 24 resists twisting about its longitudinal axis and the fact that the ends of the reinforcing member are firmly secured in the end fittings on the hose reduces the possibility of setting up torsional stresses in the hose adjacent the end fittings during installation of the hose. Desirably at least a portion of the crossband at the end of the reinforcing member will be received into and secured in the end fitting with the hose for reinforcing and stiffening the hose where it emerges from the fitting. When the hose is a metal hose as illustrated in the embodiment of Figures 1–4, the end crossband 26 as well as the ends of the strips 27 desirably will be soldered to the end fitting.

The material and the dimensions of the reinforcing member may vary considerably. Preferably the reinforcing member is made from metal which has a suitable high tensile strength, for example bronze or steel. When used on metal hose it may be made from the same material as the hose. The thickness and width of the strips will be such as to provide the desired tensile strength, resistance to twisting about the longitudinal axis, and resistance to flexure in the plane of the strip. Additional restraint against torsion and flexure can be obtained by folding the strips 27 longitudinally on themselves, for example as shown at 30 in Figure 5.

It is known that the stresses set up in a hose upon bending tend to be concentrated in zones adjacent the end fittings and that this is where the hose reinforcement and the hose itself are most likely to fail. This is particularly true in short lengths of hose employed for interconnecting relatively movable members. The hose reinforcement of the present invention lends itself to having combined therewith means for gradually increasing the resistance of the hose to flexure as the distance to the end of the hose decreases. Ordinarily it will be sufficient if this graduated flexibility of the hose extends for a short distance only from the end fittings, a distance equal to several times the diameter of the hose. In order to obtain this graduated flexibility for the hose, the end portions of the reinforcing strips 27 are stiffened with additional members lying along the strips and having graduated flexibility along the length thereof.

In the illustrative embodiment of Figures 1–4, the end portions of the strips 27 are stiffened with additional leaves or strips of metal 31, 32, 33 of graduated lengths. These leaves are laid alongside the strip 27 and their ends adjacent the end fitting are rigidly secured to the end fitting, preferably in the same manner as the reinforcing strip. The outer graduated ends of these leaves may be secured to the strip 27, for example by rivets as shown. The width of these leaves conveniently will be about the same as the width of the strip, and their thickness, exaggerated in the drawings for purposes of illustration, their number, and their lengths may be varied depending on the material from which they are made, the stiffness of the hose, the extent to which the hose must be bent, and other factors. All of the leaves may lie on one side of the strip, or some on one side and some on the other. The effect of the leaves 31, 32, 33 is to gradually increase the resistance of the hose to flexure as the distance to the end fitting decreases, so as to produce a more uniform distribution of flexure along the length of the hose and avoid the concentration of bending stresses adjacent the end fitting. It will be understood that the hose reinforcement of the present invention may be used without the additional stiffening members.

While Figures 1–5 show the hose reinforcing member applied to a flexible metal hose, it will be understood that this same reinforcing member also may be used with non-metallic hose. If desired, this reinforcing member may be applied to a hose having a braided casing.

Figure 6 shows a ribbon or blank from which the hose reinforcing member of Figures 1–4 is formed and illustrates one method of forming the reinforcing member from the ribbon. A flat ribbon 24 of metal is slitted transversely between edge portions to form crossbands 26 interconnecting the uncut edge portions or strips 27. In forming the slits 25, narrow pieces of metal may be punched out as shown in Figure 6, although that is not essential. Then alternate crossbands are pressed outwardly in one direction from the plane of the ribbon while the intervening crossbands are simultaneously pressed outwardly in the opposite direction. As the crossbands are pressed outwardly in this manner the edge portions 27 of the ribbon are drawn more closely toward each other. Dies may be made to thus form the reinforcing member from the ribbon in a single operation, in which case the slits may be simply shear cuts without having any metal punched out. In Figure 6 a long tapered punch member 34 is shown being inserted into one end of the slitted ribbon, under one crossband, over the next, under the next, and so on. As the punch is pressed forward it forces the crossbands outwardly and forms the channel which is to receive the hose.

Figures 7–10 disclose another way in which a hose reinforcing member generally similar to that shown in Figures 1–4 may be formed and applied to a hose. In this embodiment the reinforcing member comprises two similar pieces of metal which are formed, as by punching and pressing, to the shape shown in Figures 7 and 8. Each of these formed pieces or members comprises two longitudinally extending edge portions 39 which are connected by crossbands 40 uniformly spaced along the edge portions. This member differs from the member shown in Figure 6 in that the spacing between crossbands is very slightly greater than the width of the crossbands, and all of the crossbands are pressed outwardly in the same direction from the plane of the blank.

Two of these members can be assembled on a hose 41 with their concave faces toward each other in the manner illustrated in Figure 9. The parallel edge portions 39 of the members then will be secured together, as by rivets 42, to constitute reinforcing strips. This embodiment of my invention is claimed in my copending application Serial No. 478,977, filed December 31, 1954. Alternatively, two of these members can be assembled with their convex faces toward each other, the crossbands 40 of one member entering and passing through the slits of the other member, as illustrated in Figure 10. The parallel uncut edge portions of the two members may then be united, as by rivets 43, to constitute reinforcing strips. It will be evident that when the two members are assembled in the manner shown in Figure 9 they can be assembled directly on the hose 41 and with close engagement of the crossbands against the hose surface. The two members can be adjusted relative to each other along the hose prior to being united, so that the crossbands of one member are disposed directly opposite the crossbands of the other member, or so that the crossbands of one member are opposite the openings between the crossbands of the other member. When the members are assembled as shown in Figure 10 the hose 44 must be inserted after the two members have been assembled, in the same manner as described for the embodiment of Figures 1–4. Obviously in this embodiment the crossbands of one member necessarily are opposite the openings between the crossbands of the other member. In the embodiments of Figures 9 and 10 the longitudinal plane through the major transverse axis of the reinforcing strips formed by the edge portions 39 of the members will pass through the longitudinal axis of the hose.

Figures 11–15 illustrate a further modification of the hose reinforcing members of this invention. In this embodiment two similar metal strips 45 extend along opposite sides of the hose 46 and are connected at their ends to the end fittings on the hose, one of which is shown at 47. The ends of the strips are shown held between the spaced parallel ears 50 extending laterally from the end fitting, but this is merely by way of example. These strips 45, substantially coextensive with the hose as in the other embodiments, are disposed so that they lie in a common plane which passes through the longitudinal axis of the hose. The hose is held relative to the strips by a plurality of clips 48, each of which engages the hose for approximately one-half of its circumference and is connected at its ends, as by rivets 49, to the two strips. These clips 48 are spaced along the hose and may be arranged with a clip first on one side, then on the other side, and so on, as illustrated in Figures 11, 12 and 14. Alternatively the clips 48 may be disposed in pairs opposite each other, the pairs being separated longitudinally along the hose by intervening spaces as illustrated in Figures 13 and 15. Figures 11–15 show the hose reinforcement supplemented with graduated stiffening leaves 31, 32, 33 adjacent the end fitting, but it will be understood that these leaves may be omitted.

Figures 9–15 show the reinforcing members applied to rubber hose, but it will be understood that these embodiments may be used also with other types of hose, including flexible metal hose.

The hose reinforcing members of the illustrative embodiments comprise two strips connected by crossbands which engage the hose and restrain the hose against separation from the strip. The crossbands may be integrally connected to the strips as in Figures 1–10, or they may be attached to the strips, for example by rivets as in Figures 11–15, and in both cases the crossbands are "connected" to the strips within the meaning of the language of this application.

Applicant's reinforced hose and hose reinforcement have important advantages over the prior art. With applicant's construction the hose is reinforced against longitudinal extension and radial expansion, and also is protected against abrasion. Flexure of the hose is substantially limited to a plane. If desired, the end portions of the reinforcement may be made with graduated flexibility.

It will be understood that the invention herein disclosed may be variously modified and embodied within the scope of the subjoined claims.

I claim:

1. A hose reinforced against longitudinal extension and radial expansion comprising, in combination, a length of flexible hose, end fittings attached to the ends of the hose, a relatively inextensible reinforcing member coextensive with the hose and secured at its ends to the end fittings to restrain the hose against longitudinal extension, the reinforcing member comprising a flat strip of metal which is relatively inflexible in the longitudinal plane through the major transverse axis of the strip and which is disposed edgewise alongside the hose with the said plane of the strip passing through the longitudinal axis of the hose, and a plurality of bands spaced along the hose between the end fittings, said bands engaging the hose to restrain the hose against radial expansion and being connected to the strip to restrain the hose against separation from the edge of the strip, substantially to limit flexure of the hose to the longitudinal plane perpendicular to the aforesaid plane of the strip.

2. A reinforced hose according to claim 1, in which the end portions of the reinforcing strip are stiffened with additional members lying along the reinforcing strip and having graduated flexibility along the length thereof, the stiffer portions of these additional members being secured to the end fittings.

3. A reinforced hose according to claim 1, in which the end portions of the reinforcing strip are stiffened with additional thicknesses of metal of graduated lengths to gradually increase the resistance of the hose to flexure as the distance to the end fitting decreases.

4. A reinforced hose according to claim 1, in which the end of the reinforcing strip and the band nearest the end fitting are rigidly secured to the end fitting.

5. A reinforced hose according to claim 1, in which there are two reinforcing strips disposed along diametrically opposite sides of the hose, each reinforcing strip being secured at its ends to the end fittings on the hose, and in which each band engaging the hose is connected at one end to one of the strips and at its other end to the diametrically opposite strip.

6. A reinforced hose according to claim 5, in which the reinforcing strips and the bands are formed from a single piece of metal.

7. A reinforced flexible hose with flexibility substantially limited to a single plane comprising, in combination, a length of hose, end fittings attached to the ends of the hose, and a relatively inextensible reinforcing member coextensive with the hose and rigidly secured at its ends to the end fittings, the reinforcing member being formed from a metal ribbon of width substantially greater than the diameter of the hose, the ribbon having a plurality of parallel slits extending transversely thereof and terminating at uniform distances from the side edges thereof to form a plurality of crossbands interconnecting strip edge portions of the ribbon, alternate crossbands being pressed outwardly from the plane of the ribbon in one direction and intervening crossbands in the opposite direction to provide a channel through which the flexible hose extends between the end fittings.

8. A reinforced flexible hose according to claim 7, in which the strip edge portions of the ribbon are folded longitudinally on themselves.

9. A reinforced flexible metal hose according to claim 7, in which the ends of the strip edge portions of the ribbon and the end crossbands at each end of the ribbon are secured to the adjacent end fitting by a fused metal connection.

10. A hose reinforcing member for restraining round hose against elongation and circumferential expansion under pressure and for substantially limiting flexibility of the hose to a single plane, the said member being formed from a ribbon of metal of width substantially greater than the diameter of the hose, the ribbon having throughout its length a plurality of parallel slits extending transversely thereof and terminating at uniform distances from the side edges thereof to form a plurality of crossbands interconnecting strip edge portions of the ribbon, alternate crossbands being pressed outwardly from the plane of the ribbon in one direction and intervening crossbands being pressed in the opposite direction, all of the crossbands being pressed approximately to half-round contour to provide a channel for telescopically receiving the hose, the end portions of the strip side edges of the ribbon being adapted to be connected to end fittings attached to the ends of the hose.

References Cited in the file of this patent

UNITED STATES PATENTS

| | | |
|---|---|---|
| 1,035,931 | Woodhouse | Aug. 20, 1912 |
| 1,371,981 | Rose | Mar. 15, 1921 |
| 1,609,403 | Danek | Dec. 7, 1926 |
| 1,677,077 | Fortune | July 10, 1928 |
| 2,177,128 | Johnson | Oct. 24, 1938 |